April 17, 1945.  L. A. CASNATI  2,373,651

SANITARY HOLDER FOR SMALL ARTICLES

Filed Oct. 5, 1944  2 Sheets-Sheet 1

INVENTOR.
Lola A. Casnati
BY
ATTORNEY

April 17, 1945.   L. A. CASNATI   2,373,651
SANITARY HOLDER FOR SMALL ARTICLES
Filed Oct. 5, 1944   2 Sheets-Sheet 2
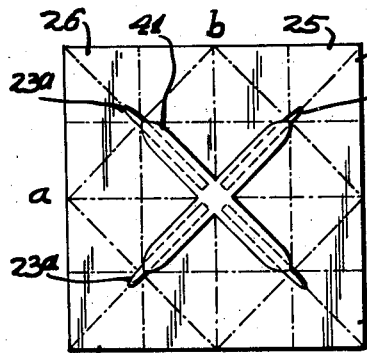
Fig. 10.
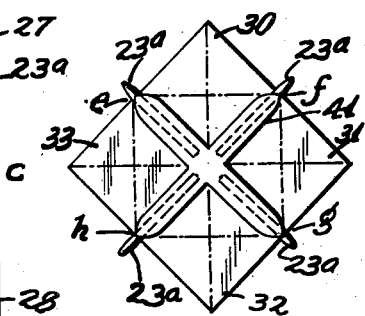
Fig. 11.
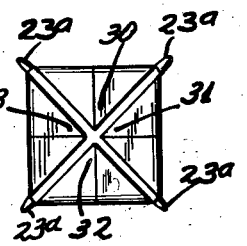
Fig. 12.
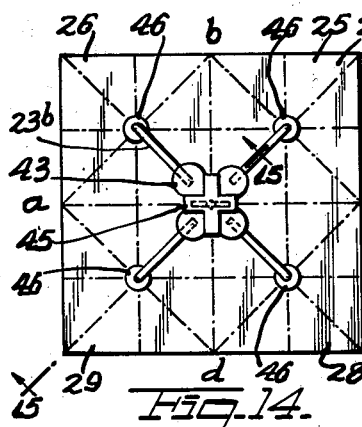
Fig. 14.
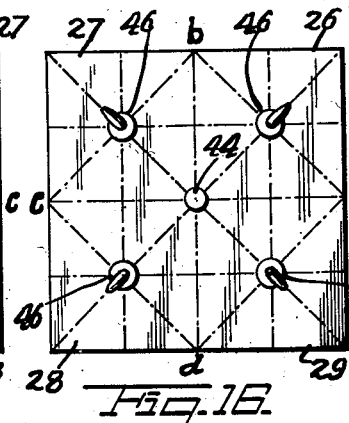
Fig. 16.
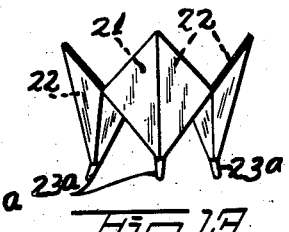
Fig. 13.
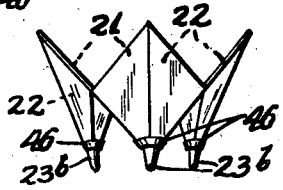
Fig. 19.
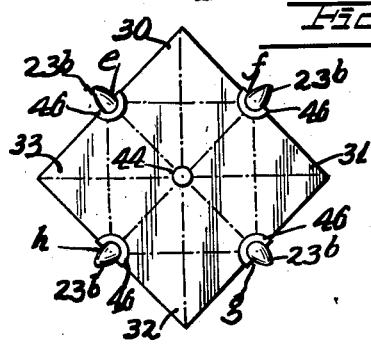
Fig. 15.
Fig. 17.
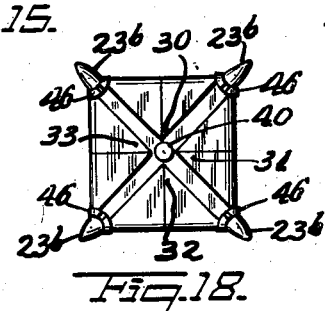
Fig. 18.
INVENTOR.
Lola A. Casnati
BY
ATTORNEY Patented Apr. 17, 1945

2,373,651

UNITED STATES PATENT OFFICE 2,373,651

SANITARY HOLDER FOR SMALL ARTICLES

Lola A. Casnati, New York, N. Y.

Refiled for abandoned application Serial No. 442,718, May 12, 1942. This application October 5, 1944, Serial No. 557,316

7 Claims. (Cl. 294—25)

This invention relates to new and useful improvements for sanitary holders for picking up small articles, particularly absorbent cotton, candies, etc.

This is a refile of my abandoned application filed on May 12, 1942, Serial Number 442,718.

More specifically, the invention contemplates characterizing the sanitary holder by a sheet of folded paper or the like material having an upwardly directed central collapsible apex portion and a plurality of downwardly directed side apex pocket portions into which one may engage one's fingers for pressing the side apex pocket portions towards each other by collapsing said central apex portion. It is proposed that artificial gripping fingers be mounted on the folded sheet and project from the bottom portions of said side apex pocket portions. Thus when they are pressed together they may grip, hold and pick up various articles desired. The advantage of this arrangement resides in the fact that direct contact between the fingers and the article is avoided and therefore the fingers are shielded from the chemicals in the articles and vice versa.

The invention contemplates numerous modified constructions which embody the dominant features thereof, distinguishing merely in the design and construction of the folded sheet and the gripping fingers.

Still further it is proposed that the artificial gripping fingers be in the nature of sticks, prongs or similar elements or parts.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Fig. 10 is a developed view of the blank used in constructing the sanitary holder of Fig. 9, this blank being illustrated provided with the artificial gripping fingers mounted in position thereon and dot and dash lines being shown on the blank to direct its folding.

Fig. 11 is a plan view of the blank shown in Fig. 10 in a partially folded position.

Fig. 12 is a bottom view of the blank shown in Fig. 11 in a further folded position.

Fig. 13 is an elevational view of the sanitary holder shown in Fig. 9.

Fig. 14 is a developed view of a blank for constructing a sanitary holder in accordance with another form of this invention, this blank being illustrated provided with artificial gripping fingers, and with dot and dash lines directing the folding thereof.

Fig. 15 is a fragmentary enlarged sectional view taken on the line 15—15 of Fig. 14.

Fig. 16 is a bottom view of the blank shown in Fig. 14.

Fig. 17 is a view similar to Fig. 16 but showing the blank in a further folded position.

Fig. 18 is a view similar to Fig. 17 but showing the blank in a still further folded position.

Fig. 19 is an elevational view of a sanitary holder formed from the parts shown in Fig. 18.

Figure 1:
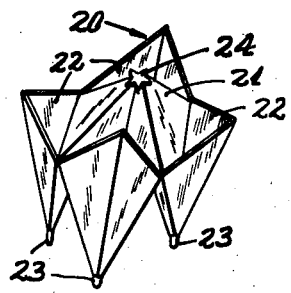
Fig. 1 is a perspective view of a sanitary holder constructed in accordance with this invention.
Figure 2:
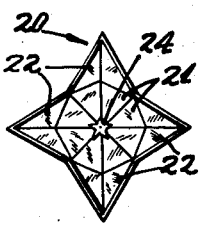
Fig. 2 is a plan view of Fig. 1.

The sanitary holder for picking up articles, according to the form of the invention shown in Figs. 1–8, includes a sheet of folded paper 20 or the like material having an upwardly directed central apex portion 21 which is collapsible and expandable due to its inherent resiliency, and a plurality of downwardly directed side apex pocket portions 22 into which one may engage one's fingers for pressing the side apex pocket portions 22 towards each other. When the pocket portions 22 are released, the central apex portion 21 will expand back to its initial position due to the resiliency of the folds of the paper from which it is made. Artificial gripping fingers 23 are mounted on the said folded sheet 20 and project from the bottom portions of the said side apex pocket portions 22. A small ornament 24 in the nature of an ornamental star is shown mounted upon the top of the central apex portion 21.

The folded sheet 20 may be made of paper or any other suitable moisture proof and acid proof material, to shield both the fingers and the article.

Figure 4:
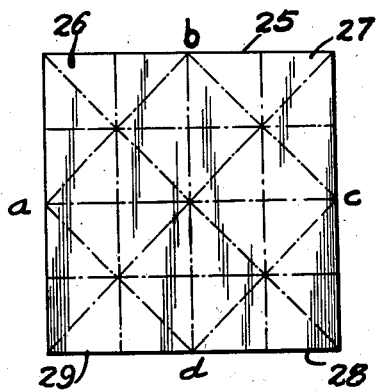
Fig. 4 is a blank which is used to construct the sheet of folded material used in the sanitary holder, this blank being illustrated with dot and dash lines which represent lines along which the blank is to be folded.
Figure 5:
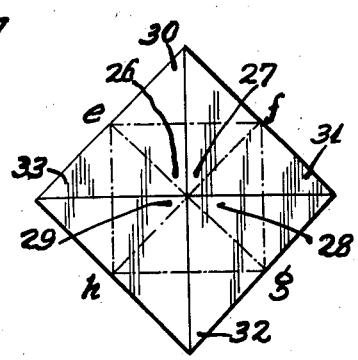
Fig. 5 is a view of the blank shown in Fig. 4 with the four corners folded upon the central portion of the blank.
Figure 6:
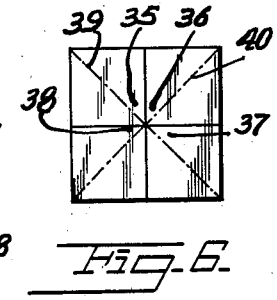
Fig. 6 is a bottom view of the blank shown in Fig. 5 but in a further folded position.
Figure 7:
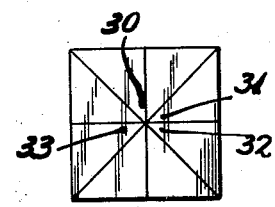
Fig. 7 is a bottom view of the blank shown in Fig. 6.
Figure 9:
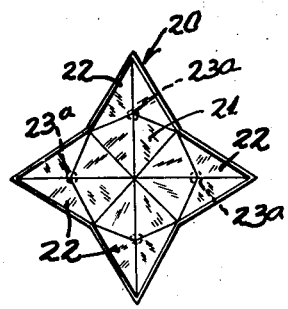
Fig. 9 is a plan view of a sanitary holder constructed in accordance with another form of this invention.

The folded sheet 20 of the sanitary holder is formed from a square blank 25 illustrated in a completely developed position in Fig. 4. To fold this blank it is necessary that the four corners 26, 27, 28 and 29 be first bent inwards along the lines ab, bc, cd, and da, respectively, so that the sheet now looks as illustrated in Fig. 5. It should be noted that the four corners were bent upon the top of the central portion of the sheet. From this condition of the sheet, the new corners 30, 31, 32 and 33 are bent beneath along the lines ef, fg, gh and he, respectively. The folded blank now appears as illustrated in Fig. 6. The blank is then turned up side down so that the bottom side is now at the top and appears as illustrated in Fig. 7. The artificial gripping fingers 23 are now mounted diagonally on the folded blank shown in Fig. 7. This is accomplished with the use of small strips of tape 34. The gripping fingers 23 are in the nature of small strips of wood, composition material or other relatively stiff material which have their projecting ends pointed. The tape 34 is mounted over these strips 23 so that their edge portions are adhesively attached along the adjacent portions of the folded sheet.

Figure 3:
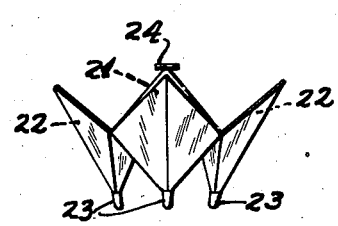
Fig. 3 is an elevational view of Fig. 1.
Figure 8:
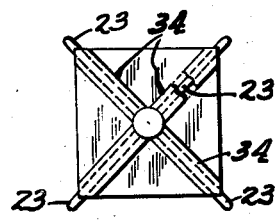
Fig. 8 is a view similar to Fig. 7 but illustrated with the artificial gripping fingers mounted in position thereon.

The folded sheet in the condition shown in Fig. 8 is now turned bottom side up and the four inner corners indicated in Fig. 6 by the reference numerals 35, 36, 37 and 38 are opened and the central portion of the sheet is forced upwards and bent along the diagonal lines 39 and 40 producing the form shown in Figs. 1 and 3, which is resilient and may be forced closed and when released will expand. Or the fingers of a user when engaged in the apex pockets 22 may expand it. The ornament 24 in the nature of a carpet tack is then mounted through the top of the central apex portion 21 of the sanitary holder. Of course, the article may be used without this ornament 24.

In Figs. 9–13 inclusive, a modified form of sanitary holder has been disclosed which distinguishes from the prior form merely in the way that the artificial fingers 23ª are mounted on the sheet portion thereof. These fingers 23ª are mounted diagonally radiating from the center thereof and held in position with tape material 41. This tape material 41 may comprise one piece of tape material cut in the shape of an X or several pieces assuming this formation. The tape material 41 engages over the gripping fingers 23ª so that edge portions thereof contact the material of the blank 25 to hold the gripping fingers 23ª in position. It should be noted that the pointed outer ends of the gripping fingers 23ª project slightly from the tape 41 and are located at a certain location. This location is one in which they will project from the bottom portions of the side apex pocket portions of the sanitary holder when it is formed. The blank 25 is bent in a manner substantially identical to the blank 25 previously described. When completely bent it will appear as shown in Fig. 12. It is then turned bottom side up and the final folding operation gives the appearance shown in Fig. 13. In this condition it is ready to be used.

In Figs. 14–19 still another form of the invention is shown which is similar to the prior form, distinguishing merely in the way in which the artificial gripping fingers 23ᵇ are mounted on the blank 25. In this form of the invention the gripping fingers 23ᵇ are mounted on the diagonal. At their inner ends they are held by a piece of tape 43 which is held upon the center of the blank by a staple 44. Another piece of tape 45 covers and hides the prong ends of the staple 44. The free ends of the gripping fingers 23ᵇ are engaged through eyelets 46 mounted upon the top and bottom faces of the blank 25 at the points illustrated particularly in Figs. 14 and 16. With this arrangement the pointed ends of the gripping fingers will project from one side of the blank 25, as clearly shown in Fig. 16. The blank is then folded in a manner identical to that previously described with reference to the blanks of the prior forms of the invention. In the final state of folding the blank will look as disclosed in Fig. 18 from which it is opened to the condition shown in Fig. 19.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers being in the nature of sticks.

2. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers being in the nature of sticks, having pointed outer ends.

3. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers being in the nature of sticks, attached to said sheet with tape material.

4. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers being in the nature of sticks, attached to said sheet with tape material, extended along its sides.

5. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers being in the nature of sticks, attached to said sheet with tape material, disposed at its ends.

6. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers having their outer ends extended through portions of said folded sheet.

7. A sanitary holder for picking up articles, comprising a sheet of folded paper or the like material having an upwardly directed central apex portion and a plurality of downwardly directed side apex pocket portions into which one may engage one's fingers for pressing the side apex pocket portions towards each other, and artificial gripping fingers mounted on said folded sheet and projecting from the bottom portions of said side apex pocket portions, said gripping fingers having their outer ends extended through portions of said folded sheet, said folded sheet at these portions being reinforced with eyelets.

LOLA A. CASNATI.